INVENTORS
JOHN R. HANSON &
BERNARD C. PHILLIPS
BY
Harry O. Ernsberger
ATTORNEY

April 14, 1970     J. R. HANSON ET AL     3,506,247
CHARGE FORMING DEVICE

Original Filed Sept. 24, 1964     5 Sheets-Sheet 2

INVENTORS
JOHN R. HANSON &
BERNARD C. PHILLIPS
BY
Harry O. Ernsberger
ATTORNEY

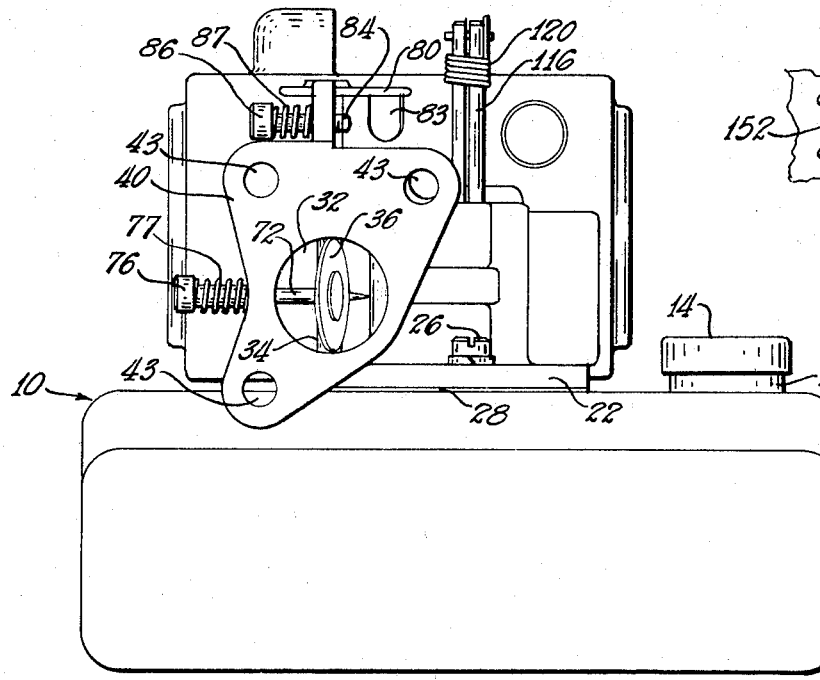
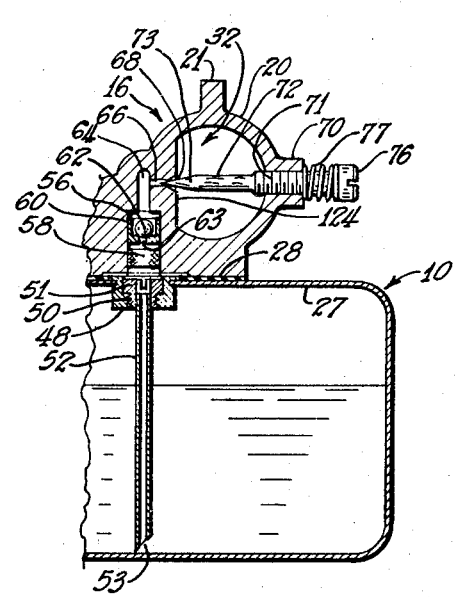
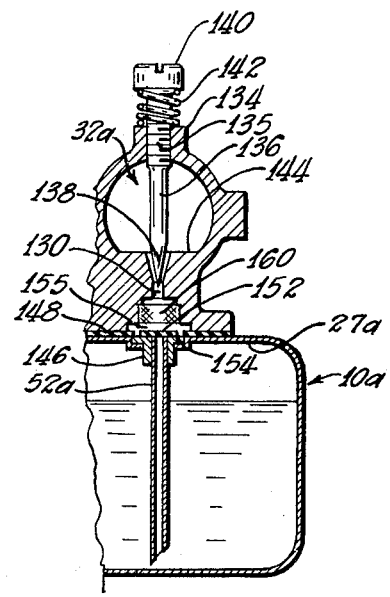

INVENTORS
JOHN R. HANSON &
BY BERNARD C. PHILLIPS

Harry O. Ernsberger
ATTORNEY

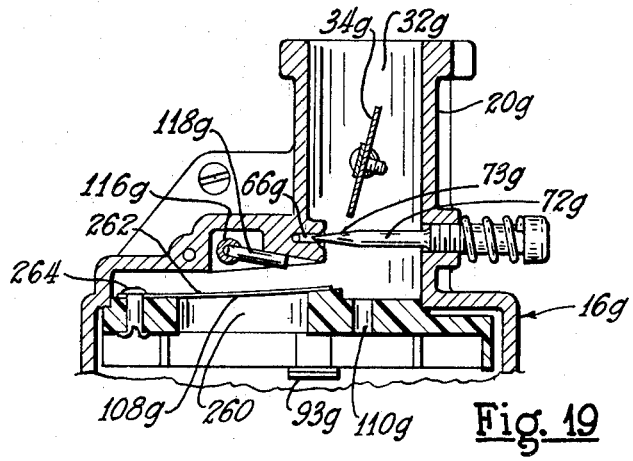
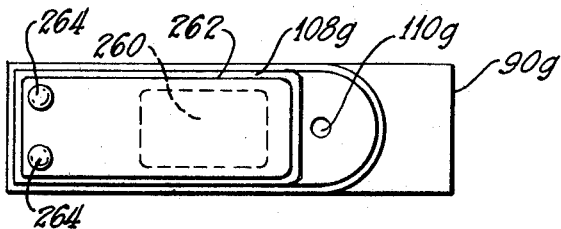

3,506,247
CHARGE FORMING DEVICE
John R. Hanson, Erie, Mich., and Bernard C. Phillips, Toledo, Ohio, assignors to The Tillotson Manufacturing Company, Toledo, Ohio, a corporation of Ohio
Continuation of application Ser. No. 399,036, Sept. 24, 1964. This application Mar. 15, 1967, Ser. No. 623,474
Int. Cl. F02m 1/02
U.S. Cl. 261—56     6 Claims

ABSTRACT OF THE DISCLOSURE

A self-lift carburetor having a flexible reed type air valve at the air inlet region of the mixing passage for controlling admission of air to the passage and an air bypass independent of the reed valve for supplying a restricted amount of air for engine idling purposes. The carburetor includes a body having a mixing passage with the body disposed above a fuel tank. A throttle valve is mounted in the mixing passage down stream of an air inlet. A fuel passage including a manually operable valve is provided in the body. A fitting is disposed in an opening in the upper wall of the fuel tank and a tubular member depends from the fitting into the fuel tank and terminates adjacent the bottom of the fuel tank. A check valve is disposed between the fuel passage and the tubular member. A valve plate is disposed between the air inlet and the mixing passage and is secured to the body. The plate has a pair of elongated ports therein for admitting air from the inlet to the mixing passage. A member having a pair of flexible reed valve portions cooperates with the ports. The plate has a concave surface for engagement with the reed valve portions. A bypass opening is provided in the plate for admitting a restricted amount of air into the mixing passage independently of the relative position of the reed valve portions.

---

This application is a continuation of our application filed Sept. 24, 1964, Ser. No. 399,036 and now abandoned.

This invention relates to charge forming devices or carburetors for use with internal combustion engines and more especially to carbuertors of the self-lift type wherein fuel is delivered from a fuel tank into a fuel and air mixing passage solely by engine aspiration or reduced pressure in the mixing passage.

The charge forming device or carburetor of the invention has particular utility for supplying a fuel and air mixture to internal combustion engines of comparatively low horsepower such as those used for power lawn mowers, for operating small generators, marine engines and the like where the fuel supply tank is disposed beneath and adjacent the charge forming device or carburetor.

The present invention embraces the provision of a charge forming device or fuel and air mixing arrangement wherein the fuel is conveyed directly from the fuel tank into an air stream moving through a mixing passage solely by the differential or subatmospheric pressure created in the mixing passage by operation of the engine with which the charge forming apparatus is used.

Another object of the invention is the provision of a charge forming apparatus which functions without auxiliary mechanisms such as float controlled valves, diaphragm controlled valves and wherein proper metering of fuel into a mixing passage is attained under normal operating conditions.

Another object of the invention resides in a self-lift carburetor embodying a single fuel adjusting means.

Another object of the invention is the provision of a self-lift carburetor embodying an air valve of the reed type movable under reduced pressure or aspiration developed by the engine for controlling air flow through the mixing passage in association with means for maintaining the reed valve construction in closed position for engine starting purposes in lieu of a conventional choke valve.

Another object of the invention is the provision of a self-lift carburetor arranged for mounting directly upon a fuel supply tank whereby the carburetor and fuel tank may be subjected to substantial tilt without impairing delivery of fuel to the mixing passage and which substantially eliminates the possibility of the carburetor flooding when not in use.

Another object of the invention is the provision of a self-lift carburetor wherein fuel is delivered to the mixing passage in a manner to develop high torque at low engine speeds and to prevent stalling of the engine under excessive loads.

Another object of the invention is the provision of a self-lift carburetor fashioned of a minimum number of parts and embodying a minimum of fuel channels whereby the carburetor may be produced at comparatively low cost and which is very reliable in operation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing in the form of the invention, which may be preferred, in which:

FIGURE 6 is a view from the engine side of the carburetor and fuel tank;

FIGURE 7 is a vertical sectional view taken substantially on the line 7—7 of FIGURE 1;

FIGURE 9 is a vertical sectional view illustrating a modification of the invention;

FIGURE 10 is an isometric view showing a portion of a combined gasket and flap valve component of the construction shown in FIGURE 9;

FIGURE 19 illustrates a form of the invention embodying a single reed valve, and FIGURE 20 is a plan view of the reed valve and mounting plate shown in FIGURE 19.

Figure 1:
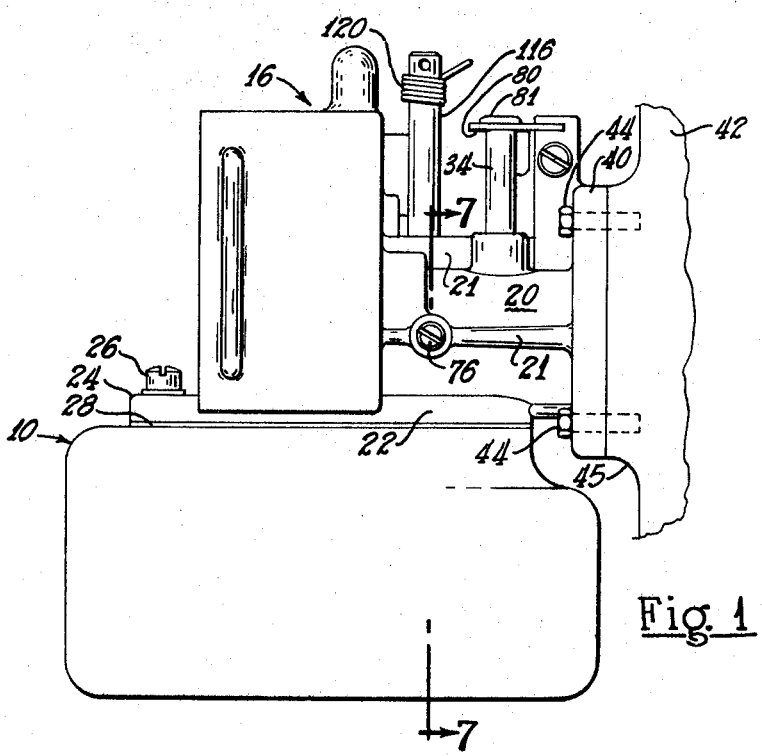
FIGURE 1 is an elevational view of a form of self lift carburetor of the invention in association with a fuel supply tank and illustrating a portion of an internal combustion engine and mounting means for the carburetor.
Figure 2:
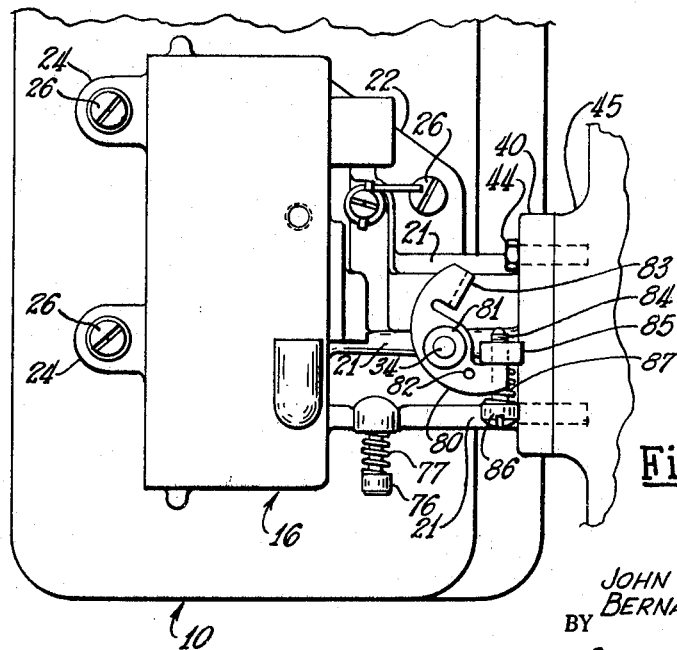
FIGURE 2 is a top plan view of the arrangement shown in FIGURE 1.

While the forms of the invention illustrated are adaptable for use with both two cycle and four cycle internal combustion engines and more particularly for use with engines of the character employed for powering lawn mowers, it is to be understood that the carburetor or charge forming apparatus may be used with engines where the carburetor and fuel tank are not subject to extreme positions of tilt.

Referring to the drawings in detail, FIGURES 1 through 4, 6 and 7 illustrate a charge forming apparatus or carburetor of the invention mounted directly above and upon a fuel supply reservoir or tank whereby the fuel may be lifted or conveyed into the mixing passage with a minimum of aspiration or reduced pressure, and illustrates the carburetor secured directly to an engine crankcase or an engine manifold whereby the carburetor and the fuel tank are supported by the engine. The fuel tank or receptacle 10 is provided with a filler neck 12 defining a filler opening for filling the tank with liquid fuel, a removable cap or closure 14 normally closing the filler opening.

The charge forming apparatus or carburetor includes a body 16, which may be fashioned of metal or molded resinous plastic such as Delrin (polyoxymethylene), and is formed with a substantially rectangular hollow portion 18 and a generally cylindrically-shaped portion 20, the latter being reinforced by lengthwise extending ribs 21 integral with the portions 18 and 20. The carburetor body 16 is provided with a base member or flange 22 adapted to be secured to the fuel tank 10.

The flange 22 is fashioned with lugs 24, the flange and the lugs being provided with openings accommodating securing screws 26 which extend through openings formed in the horizontal upper wall of the fuel tank 10 and into threaded openings in a reinforcing plate (not shown) secured to the inner surface of the upper wall or top 27 of the tank 10.

A gasket 28 is disposed between the flange 22 and the fuel tank 10. The screws 26 are drawn up to securely mount the fuel tank on the carburetor body, the gasket 28 forming a tight seal between the fuel tank and the carburetor body.

Figure 4:
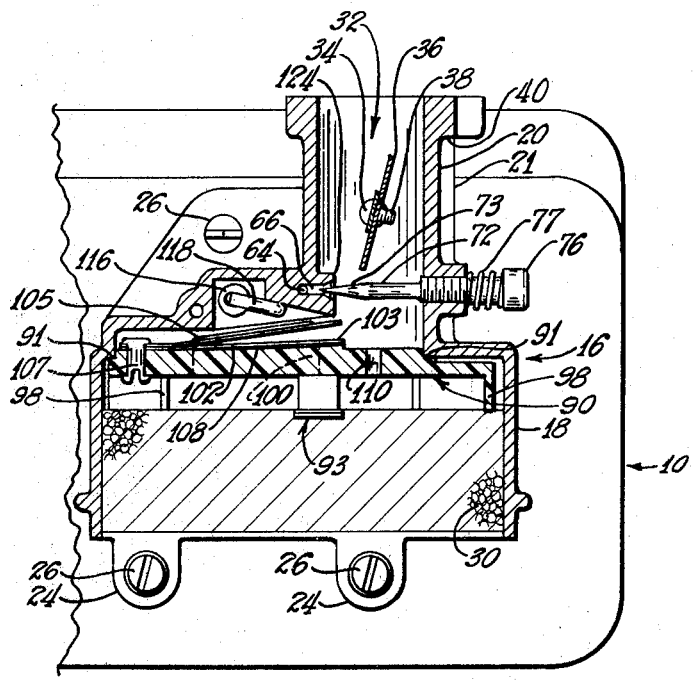
FIGURE 4 is a horizontal sectional view taken substantially on the line 4—4 of FIGURE 3 and showing the air filter.

The substantially rectangular portion 18 of the carburetor body is of hollow configuration, as shown in FIGURE 4, and accommodates an air filter or strainer 30 for filtering foreign particles from the air admitted to the mixing passage in forming the fuel and air mixture for the engine. The filter 30 may be fashioned of metal lame, plastic sponge-like material or other suitable filtering material which may be readily removed and cleaned. The generally cylindrical portion 20 is tubular or hollow providing a mixing passage 32, the walls of the mixing passage being provided with diametrically opposed openings in which is journaled a throttle shaft 34.

A disc-type throttle valve or member 36 is secured to the shaft by a screw 38. The cylindrical portion 20 of the carburetor body 10 terminates in a mounting flange 40. In the embodiment illustrated the carburetor is shown in association with a crankcase 42 of a two cycle engine, the mounting flange 40 being fashioned with openings 43 accommodating securing bolts 44 for fastening the carburetor to a boss 45 formed on the crankcase. It is to be understood that where the carburetor is used with a four cycle engine, the mounting flange 40 is secured to a mixture intake manifold.

FIGURES 4 and 7 illustrate the fuel channels or fuel passage means for delivering fuel from the fuel tank into the mixing passage 32 by engine aspiration or reduced pressure set up in the mixing passage. As shown in FIGURE 7, the upper horizontal wall 27 of the fuel tank is provided with an opening accommodating a fitting 48, the fitting being welded to securely fasten the fitting 48 to the fuel tank top wall 27. The fitting 48 is interiorly threaded as at 50 to accommodate a threaded member 51.

The threaded member 51 is bored to accommodate the upper end of a tube or tubular member 52 which is pressed or snugly fitted in the bore in the fitting 51, the entrance region 53 of the tube terminating adjacent the bottom of the fuel tank 10, as shown in FIGURE 7. The tube 52 is preferably disposed centrally of the fuel tank 10 so that the entrance end of the fuel tube is immersed in fuel even though the tank is in a position of substantial tilt. The body 16 is provided with a bore 56, the axis thereof being preferably aligned with the axis of the tube 52.

Disposed in the bore 56 is a fuel strainer or screen 58 and a valve cage or valve support 60, the latter containing a check valve means such as a ball-type check valve 62 for normally closing a port 63 in the valve cage against return of fuel into the tank.

The check valve 62 may be made of metal or of resinous plastic such as Delrin or nylon. The bore 56 is in communication with a fuel channel 64 which, in turn, is in communication with a fuel passage 66, the outlet 68 of the passage 66 opening into the mixing passage 32 and providing a fuel delivery orifice.

The wall of the tubular portion 20 defining the mixing passage is fashioned with a boss 70 having a threaded bore to accommodate a threaded portion 71 of a manually adjustable valve 72 having a conically-shaped valve portion 73 which extends into and cooperates with the fuel outlet passage 66 to provide an adjustment for metering or regulating fuel delivered into the mixing passage. The valve member 72 is provided with a manipulating head 76 for adjusting the valve member, an expansive coil spring 77 being disposed between the boss 70 and the head 76 to provide sufficient friction to maintain the valve member 72 in adjusted position.

Thus from FIGURE 7 it will be apparent that engine aspiration or reduced pressure set up in the mixing passage 32 causes fuel to be lifted by such differential pressure upwardly through the tube 52 through the screen 58, port 63 past the check valve 62 and through the passages 64 and 66 into the mixing passage where the fuel is mixed with air moving through the mixing passage 32, the inflow of air being controlled by valve means hereinafter described.

The carburetor arrangement embodies a single fuel delivery outlet 68 as the throttle valve 36 is usually connected with a governor mechanism (not shown) associated with the engine for maintaining the speed of the engine substantially constant under varying loads by automatic governor control of the position of the throttle valve.

Means is provided for limiting a near closed position of the throttle valve 36 for engine idling or low speed operation. The portion of the throttle shaft 34 extending exteriorly of the mixing passage is equipped with an arm 80 secured to the shaft by swaging as shown at 81. The arm 80 is provided with an opening 82 to accommodate a wire or other means for connection with an engine driven governor (not shown). It is to be understood that the throttle 36 may be manually controlled, if desired. The arm 80 is fashioned with a pad portion 83 which cooperates with an adjusting screw 84.

The portion 20 of the carburetor is provided with a boss 85 having a threaded bore accommodating an adjusting screw 84, the latter having a manipulating head portion 86, an expansive coil spring 87 being disposed between the boss 85 and the head 86 to provide sufficient friction for retaining the screw 84 in adjusted position. The screw 84 provides an abutment arranged to be engaged by the pad 83 of the arm 80. By adjusting the position of the screw 84, the near closed position of the throttle 36 may be regulated for engine idling and low speed purposes.

the valve when the latter is lifted from its seat by aspiration in the carburetor mixing passage. The carburetor body 16c is fashioned with a mixing passage 174c. A fuel passage 180c provides an orifice or outlet 182c for delivering fuel into the mixing passage.

A bore 184c accommodates a valve member 188c fashioned with a needle valve portion 192c, which cooperates with a fuel passage 218 in communication with the tube 206, whereby fuel in the tank 10c, under the influence of engine aspiration or reduced pressure in the mixing passage 174c, elevates fuel past the ball check valve 214, through tube 206 and fuel passage 218, past the needle valve 192c and through the fuel passage 180c into the mixing passage. It is to be understood that the fuel conveying tube and check ball arrangement shown in FIGURE 13 may be utilized with other arrangements of fuel metering valve such as those illustrated in FIGURES 7 and 9.

Figure 14:
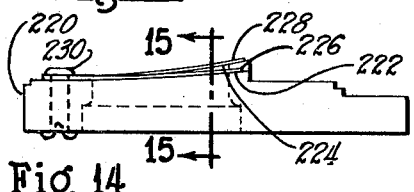
FIGURE 14 is an elevational view illustrating a modified form of reed valve construction.
Figure 15:
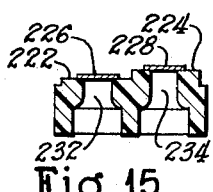
FIGURE 15 is a vertical sectional view taken substantially on the line 15—15 of FIGURE 14.

FIGURES 14 and 15 illustrate an arrangement of reed valves wherein one reed valve is pretensioned or stressed a greater amount than the other by reason of different inclinations or angularities of the reed valve seats or ramps fashioned on the reed valve mounting plate. The reed valve mounting plate 220, of the same general configuration as the plate 90 shown in FIGURE 4, is fashioned with a first ramp or valve seat 222 and a second ramp or valve seat 224. A reed valve 226 is arranged to seat on the ramp 222 and a reed valve 228 is arranged to seat on the ramp 224.

As particularly shown in FIGURE 14, the ramp or valve seat 222 is of lesser angularity or inclination than the ramp 224. Both ramp surfaces are slightly concavely curved, as hereinbefore described in reference to the ramp or valve seat 108 of the reed valve plate 90, to stress the reed valves to promote an effective seating of the reed valves when the same are in closed position.

The reed valves 226 and 228 are secured at one end to the valve plate 220 by means of securing members or rivets 230. The reed valve 226 cooperates with an elongated valve port 232 in the mounting plate and the reed valve 228 cooperates with an adjacent elongated valve port 234.

By fashioning the ramps or valve seats of different angularities, a greater amount of tension or stress is established in the reed valve 228 than the stress on the reed valve 226 on the ramp of lesser angularity whereby the reed 226 will be opened under slight aspiration in the mixing passage and before the reed 228 is opened under increased aspiration. By varying the angularity of the ramps or valve seats 222 and 224, the flow of air into the mixing passage may be calibrated or controlled to secure the most efficient combustible mixture of air and liquid fuel in the mixing passage.

Figure 16:
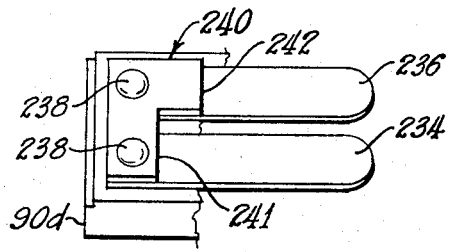
FIGURE 16 is an isometric view illustrating a form of clamp construction for the reed valves.

FIGURE 16 illustrates a mounting arrangement for the reed valves wherein a reed valve clamping means is shaped to facilitate the opening of one reed under the influence of less aspiration than the other. The valve mounting plate 90d, of the character shown at 90 in FIGURE 4, supports reed valves 234 and 236 by rivets 238. Disposed adjacent the outer surfaces of the reed valves is a clamping means 240 having a portion 241 engaging an end region of the reed 234, the member 240 having an elongated portion 242 contiguous with the reed valve 236 and extending parallel with the valve 236 for a substantial distance as illustrated, the rivets 238 securing the clamp means 240 and the reed valves to the valve plate 90d.

The clamp member 240 is of a thickness to be substantially rigid and the elongated portion 242 thereof places added restraint or stress on the reed valve 236 whereby reed valve 234 will be opened under less aspiration in the mixing passage, the reed valve 236 being opened to admit additional air to the mixing passage when the aspiration in the mixing passage is sufficient to overcome the stress or resistance to opening movement established by the elongated portion 242 of the clamp 240. By varying the length of the portion 242 of the clamp 240, the air flow into the mixing passage may be calibrated or controlled.

Figure 17:
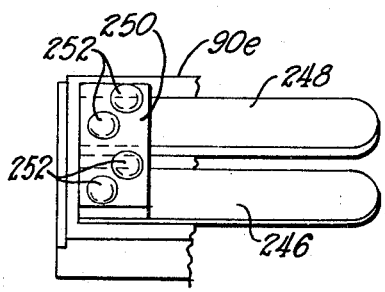
FIGURE 17 is an isometric view illustrating a modified form of reed valve construction.

FIGURE 17 illustrates a reed valve arrangement wherein a reed valve mounting plate 90e supports a comparatively thin reed valve 246 and a second reed valve 248 of greater thickness than the valve 246. The valves are securely fastened to the mounting plate 90e by a clamp member 240 and securing means or rivets 252. The relative thickness of the reeds 246 and 248 may be varied dependent upon the calibration of air flow desired for the mixing passage. The comparatively thin reed valve 246 will be opened under slight aspiration in the mixing passage while increased aspiration is required to effect opening of the thicker reed valve 248. The thin reed valve should be disposed at the lower region of the air inlet of the mixing passage to sweep fuel toward the throttle region.

It is to be understood that the reed valves 246 and 248 may be fashioned as integral components or the thin reed valve 246 may be a separate component joined with a separate reed valve 28 adjacent the clamping means 250.

Figure 18:
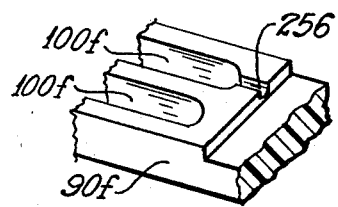
FIGURE 18 is a fragmentary isometric view of a reed valve mounting plate showing another form of air bypass.

FIGURE 18 illustrates a reed valve mounting plate embodying another form of air bypass for engine idling purposes. The reed valve plate 90f is fashioned with elongated air passages or ports 100f which are normally closed by reed valves as hereinbefore described. The plate 90f is formed with a small channel 256 in communication with one of the ports 100f providing a bypass for admitting air to the mixing passage even though the reed valves are in closed position. The air bypass arrangement of FIGURE 18 is for the same purpose as the air bypass 110, shown in FIGURE 4.

FIGURES 19 and 20 illustrate a form of the invention embodying a single reed valve construction, the carburetor body 16g being of the character shown in FIGURE 4. The carburetor body is inclusive of a tubular portion 20g providing a mixing passage 32g in which is disposed a throttle valve 34g. The carburetor body is provided with a fuel passage 66g for delivering fuel from a fuel tank into the mixing passage under the influence of engine aspiration. An adjustable valve 72g having a needle valve portion 73g cooperates with the fuel passage 66g to regulate delivery of fuel into the mixing passage.

Disposed in the air inlet region of the carburetor is a mounting plate 90g secured in position by a clamping member 93g. The mounting plate 90g is fashioned with an air inlet port or port means 260. A single reed valve 262 is secured to the mounting plate 90g by rivets 264 or other suitable fastening means.

The mounting plate 90g is formed with a valve seat surface or ramp 108g of the character of the valve seat 108 shown in FIGURE 4, the valve seat being slightly concavely curved to enhance seating of the reed valve. Journaled in openings formed in the walls of the carburetor body is a shaft 116g provided with an arm 118g which is normally biased by a spring to a position, shown in FIGURE 19, out of engagement with the reed valve 262. During engine starting operations, the shaft 116g is manually rotated to move the arm 118g into engagement with the reed valve 262 to hold the reed valve in substantially closed position in engagement with its valve seat 108g to restrict air flow to the mixing passage. With the reed valve in closed position, the air bypass 110g admits a restricted amount of air to the mixing passage during the period that the reed valve 262 is held in closed position, the bypass 110g also providing a restricted amount of air for engine idling purposes.

While it is preferred to fashion the reed valve constructions of the forms shown of metal or metal alloy such as steel, stainless steel, hard copper, brass or the like, it is to be understood that the reed valve constructions may be made of resinous plastic or other suitable nonmetallic material.

We claim:

1. A charge forming apparatus for internal combustion engines comprising, in combination, a body provided with a mixing passage, a throttle valve in said mixing passage, said body having an air inlet region, a fuel passage in said body arranged to deliver fuel into the mixing passage, a manually adjustable needle valve mounted by the body extending into said fuel passage for regulating delivery of fuel into the mixing passage, a tubular member in communication with the fuel passage adapted to extend into a fuel tank whereby fuel is conveyed through said tubular member and fuel passage into the mixing passage by aspiration in the mixing passage, a plate disposed between the air inlet region and the mixing passage having a pair of ports therein, a surface of the plate adjacent the ports being of concave curvature, flexible reed valve means having reed portions disposed adjacent said port and normally arranged to engage the curved surface of said plate, means securing the reed valve means to said plate, an element secured to said plate for limiting the opening movement of said reed valve portions, a shaft journaled in the body having an arm portion arranged whereby rotation of the shaft engages the arm portion with said element for moving said element to a position to prevent opening of the reed valve portions for engine starting purposes.

2. A charge forming apparatus and fuel tank construction for internal combustion engines comprising, in combination, a fuel tank, said charge forming apparatus including a body having a mixing passage, said body being disposed above the fuel tank, means securing the body to the fuel tank, a throttle valve in said mixing passage, said body having an air inlet region, a fuel channel provided in the wall of a mixing passage having an outlet for delivering fuel into the mixing passage, a manually operable valve means cooperating with said fuel channel for controlling fuel delivery into the mixing passage, a fitting disposed in an opening in the upper wall of the fuel tank, tubular means depending from said fitting into the fuel tank and terminating adjacent the bottom wall of the fuel tank, said fuel channel being in communication with the tubular means, a valve plate disposed between the air inlet region and the mixing passage, means securing said valve plate in said body, said plate having an elongated port therein for admitting air from the inlet region to the mixing passage, a flexible reed valve cooperating with said port, means for limiting the opening movement of the reed valve, means movable to a position holding the reed valve in substantially closed position during engine starting operations, and a bypass for admitting a restricted amount of air from the inlet region into the mixing passage independently of the relative position of the reed valve.

3. A charge forming apparatus and fuel tank construction for internal combustion engines comprising, in combination, a fuel tank, said charge forming apparatus including a body having a mixing passage, said body being disposed above the fuel tank, means securing the body to the fuel tank, a throttle valve in said mixing passage, said body having an air inlet region, a fuel passage provided in the body for delivering fuel into the mixing passage, a manually operable valve means cooperating with said fuel passage for controlling fuel delivery into the mixing passage, a fitting disposed in an opening in the upper wall of the fuel tank, tubular means depending from said fitting into the fuel tank and terminating adjacent the bottom wall of the fuel tank, check valve means disposed between the fuel passage and the tubular means, a valve plate disposed between the air inlet region and the mixing passage, means securing said valve plate in said body, said plate having a pair of elongated ports therein for admitting air from the inlet region to the mixing passage, a member having a pair of flexible reed valve portions cooperating with said ports, said plate having a concave surface adapted to be engaged by said reed valve portions, an abutment element for limiting the opening movements of the reed valve portions, means securing the reed valve member and abutment element to said plate, a shaft journaled in said body, an arm associated with the shaft and arranged whereby rotation of the shaft engages and moves the abutment element to a position holding the reed valve portions in engagement with the curved surface of the plate, and an opening in said plate for admitting a restricted amount of air from the inlet region into the mixing passage independently of the relative position of the reed valve portions.

4. A carburetor and fuel tank construction for internal combustion engines comprising, in combination, a fuel tank, a carburetor having a body provided with a mixing passage, said body being disposed above the fuel tank, means securing the body to the fuel tank, a gasket disposed between the carburetor and the fuel tank, a throttle valve in said mixing passage, said body having an air inlet region, a fuel passage in said body having an outlet opening into the mixing passage for delivering fuel into the mixing passage, a manually operable valve means cooperating with said fuel passage for controlling fuel delivery into the mixing passage, a fitting disposed in an opening in the upper wall of the fuel tank, tubular means depending from said fitting into the fuel tank and terminating adjacent the bottom wall of the fuel tank, said tubular means being arranged to convey fuel to the fuel passage, a flap valve integral with said gasket arranged to engage said fitting to prevent return flow of fuel through the tubular means, a valve plate disposed between the air inlet region and the mixing passage, means securing said valve plate in said body, said plate having a port therein for admitting air from the inlet region to the mixing passage, a reed valve mounted by the plate for cooperation with said port, means mounted by the body movable to a position holding the reed valve in port-closing position, and an opening in said plate for admitting a restricted amount of air from the inlet region into the mixing passage independently of the relative position of the reed valve.

5. A charge forming apparatus for internal combustion engines comprising, in combination, a body provided with a mixing passage, a throttle valve in the mixing passage, the mixing passage having an air inlet region, a fuel passage in the body arranged to deliver fuel into the mixing passage, an adjustable valve supported by the body for regulating fuel delivery into the mixing passage, tubular means in communication with the fuel passage adapted to extend into a fuel tank whereby fuel is conveyed through said tube means and fuel passage into the mixing passage by aspiration in the mixing passage, a reed valve support plate extending across the air inlet region of the mixing passage having ports therein, reed valves mounted by said plate cooperating with said ports for admitting air to the mixing passage for mixing with liquid fuel in the mixing passage, one of said reed valves having greater resistance to opening movement than the other to secure differential opening movements of the reed valves under the influence of aspiration in the mixing passage.

6. A charge forming apparatus for internal combustion engines comprising, in combination, a body provided with a mixing passage, a throttle valve in the mixing passage, the mixing passage having an air inlet region, a fuel passage in the body arranged to deliver fuel into the mixing passage, an adjustable valve supported by the body for regulating fuel delivery into the mixing passage, tubular means in communication with the fuel passage adapted to extend into a fuel tank whereby fuel is conveyed through said tube means and fuel passage into the mixing passage by aspiration in the mixing passage, a reed valve support plate extending across the air inlet region of the mixing passage having ports therein, reed valves cooperating with said ports for admitting air to the mixing passage for mixing with liquid fuel in the The air supply for the mixing passage 32 is controlled by a reed valve mechanism responsive to aspiration or reduced pressure developed by the engine which admits air to the mixing passage in proportion to the speed of the engine. Disposed within the hollow rectangular portion of the carburetor body defined by the wall 18 is a valve plate or valve mounting plate 90 which is properly positioned in the carburetor by ledges or shoulders 91, as shown in FIGURE 4. The valve plate 90 may be fashioned of molded resinous plastic such as nylon or Delrin (polyoxymethylene) or may be fashioned of metal.

Figure 3:
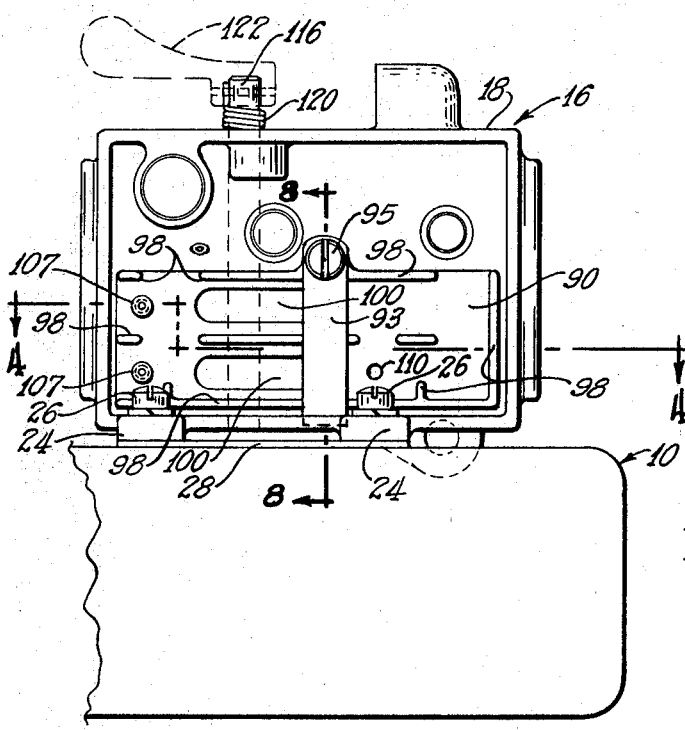
FIGURE 3 is a front elevational view of the construction shown in FIGURES 1 and 2, the air filter being removed.
Figure 5:
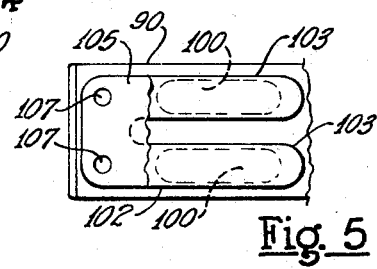
FIGURE 5 is a plan view of a reed valve and valve plate construction forming a component of the carburetor.
Figure 8:
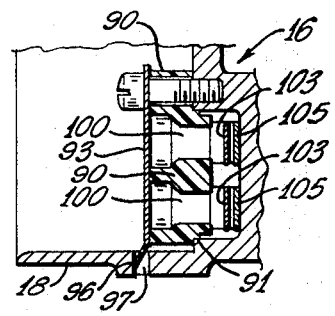
FIGURE 8 is a fragmentary sectional view taken substantially on the line 8—8 of FIGURE 3.

The valve plate or member 90 is held in position by means illustrated in FIGURES 3, 4 and 8. A supporting bar 93 is secured at one end to the carburetor body by means of a screw 95 extending through an opening in the plate 90, the other end of the bar being engaged with a ledge 96 provided by an opening 97 in a wall of portion 18, as particularly shown in FIGURE 8. The plate 90 is fashioned with ribs or flanges 98 forming abutment means for positioning the air filter or strainer 30 as shown in FIGURE 4, the ribs additionally serving to reinforce and prevent warpage of the valve plate.

The valve plate 90 is fashioned with two ports, openings or air passages 100 of elongated shape and arranged in parallelism.

A reed valve construction or valve member 102, fashioned of comparatively thin flexible metal, is configurated or shaped to provide two parallel reeds or valve portions 103 adapted to open and close the air passages 100 upon flexing movements of the valve portions 103. Disposed adjacent the valve member 102 is a flexible member 105, particularly shown in FIGURE 4, which normally extends upwardly in an angular position relative to the plate 90 to limit the opening movement of the valve reeds 103.

The end region of the valve member 102 and a contiguous portion of the plate or flexible member 105 are secured to the valve plate 90 by means of rivets 107 or other suitable securing means. The flexible reed valve portions 103 of the valve member 102 are shown in closed or valve seating position in FIGURE 4. The valve seat 108 provided on the plate 90 for the flexible reed valve portions 103 is slightly concave, being curved upwardly in a right-hand direction as viewed on FIGURE 4. Through the curved configuration of the valve seat 102, the reed valve portions 103 are more uniformly stressed or biased throughout their length to valve closing position.

The tension or stress imparted to the reed valves 103 by the slight concave curvature of the valve seat 108 enables a gradual opening of the valves under differential pressures set up in the mixing passage to effect a proper calibration of the fuel and air mixture at various engine speeds.

The valve member 102 provided with the integral reed valves 103 is fashioned of comparatively thin carbon steel, stainless steel, beryllium copper or other material having characteristics of these metal alloys.

The valve mounting plate or valve support 90 is provided with an air bypass opening or passage 110 shown in FIGURE 4 for engine idling purposes. The air bypass 110 is preferably at the lower region of the air entrance to the mixing passage for scavenging any fuel collecting in the lower region of the air entrance and for leaning out the fuel and air mixture at comparatively low engine speeds.

The air passage 110 is important in order to prevent over-enrichment of the mixture at low engine speeds and is of a size to provide for a satisfactory fuel and air mixture at low engine speeds. If the passage 110 is too large, too much air would be admitted to the mixing passage at low speeds and the mixture would be too lean to operate the engine. It has been found that for the average size of engine for power lawn mowers that the air passage 110 should be about 3/16 of an inch in diameter, although the size may be varied depending upon the capacity or size of the carburetor and the engine with which it was used.

Means is provided for temporarily holding the reed valves 103 in closed position in starting the engine to provide a rich mixture as the only air flowing through the mixing passage with the reed valves closed is that admitted through the passage 110. Journaled in openings formed in the walls of the carburetor body is a shaft 116 upon which is fixedly secured an arm or member 118, shown in FIGURE 4, which is normally out of engagement with the abutment plate 105 adjacent the reed valve structure.

The shaft 116 is equipped with a coil spring 120 arranged to normally bias the shaft for rotation in a direction to maintain the arm or member 118 out of engagement with the abutment plate 105, as in FIGURE 4. The shaft 116 may be provided with a manipulating knob 122, shown in broken lines in FIGURE 3, for rotating the shaft causing the arm 118 to engage and flex the abutment 105 downwardly against the reed valves 103 for holding the reed valves in closed position, providing a means for restricting air flow during engine starting operations in lieu of the conventional choke valve.

It should be noted that a region of the carburetor adjacent the fuel delivery passage 66 is fashioned with a boss portion 124 which, as shown in FIGURES 4 and 7, provides a restricted zone adjacent the fuel delivery region whereby the highest air velocity is at the region of the boss simulating a partial Venturi effect to provide an effective reduced pressure to enhance the lifting of liquid fuel from the fuel tank and promoting delivery of fuel into the mixing passage to provide a fuel and air mixture of the proper proportion.

The operation of the carburetor is as follows: The operator, in starting the engine, rotates the shaft 116 to engage the arm 118 with the abutment plate 105, flexing the abutment plate downwardly into contiguous engaging relation with the reed valves 103 to prevent opening of the reed valves 103 during engine starting operations. The engine is started by reason of the enrichened fuel and air mixture provided by fuel delivered from the outlet of the passage 66 mixed with a restricted amount of air admitted through the air passage or bypass 110.

After the engine has been started, the operator releases his grasp of the manipulating handle 22 and the shaft 116 rotated under the influence of the spring 120 to move the arm 118 to the position shown in FIGURE 4 whereby the reed type air valves 103 may be opened by differential pressures set up by engine aspiration in the mixing passage 32. Thus, the air for forming the fuel and air mixture for normal engine operations is admitted through the ports 100 together with the small amount of air admitted through the unimpeded passage 110.

The reed valves 103 are opened to an extent dependent upon the differential or reduced pressure in the mixing passage, this pressure being dependent upon the extent of opening of the throttle valve 36 controlling the speed of the engine.

As the throttle valve 36 is usually controlled by an automatic engine-operated governor (not shown), the amount of air admitted through the valved ports 100 and the amount of fuel delivered from the outlet passage or main orifice 66 are maintained in proper proportion to provide for an effective fuel and air mixture at all engine speeds for which the engine may be governed.

It should be noted that all of the air admitted to the mixing passage 32 is filtered through the filter or strainer 30 to prevent foreign matter entering the mixing passage. The check valve 62 cooperates with the port 63 to prevent reverse flow of liquid fuel into the tank 10 so that fuel is usually maintained in the tube 52 and the bore 56 up to the check valve 62 to enhance rapid delivery of fuel from the region of the check valve through the main orifice 68. While the fuel tank may be disposed at a greater distance from the main fuel delivery orifice than that illustrated in the drawings, it is preferable to position the carburetor directly on the fuel tank so that a minimum lift or reduced pressure is required to elevate fuel from the tank for delivery into the mixing passage.

The degree of flexibility of the reed valves 103 may be controlled to obtain most efficient fuel mixture for a particular engine. If the initial tension or stress of the reed valves is increased, the fuel lift factor is increased as a higher differential pressure is required to flex the reed valves. This control may be exercised by providing a particular thickness of valve reed in the carburetor.

The valve members should not be of too great a thickness as they tend to restrict air flow at high speeds and thereby reduce or impair the power output of the engine. It has been found that for the average size engine used for powering lawn mowers that the reed valves 103 may be made of metal of .006 to .008 thousandths inch in thickness. Reeds of greater thickness and hence less flexible may be used where the valve ports are increased in size.

FIGURES 9 and 10 illustrate a modification of the invention. As shown in FIGURE 9, the carburetor body 20a is fashioned with a fuel delivery passage 130 opening into the mixing passage 32a forming the fuel delivery nozzle or orifice. In this form the fuel delivery passage 130 is vertically disposed and opens into the lower portion of the mixing passage. The carburetor body 20a is equipped with a boss 134 having a threaded bore to receive the threaded portion 135 of a manually adjustable needle valve 136, the latter equipped with a tapered or needle portion 138 which extends into and cooperates with the fuel passage 130 for controlling delivery of fuel into the mixing passage.

The valve member 136 is provided with a manipulating head portion 140, an expansive coil spring 142 being disposed between the boss 134 and the head 140 to provide friction for maintaining the valve member in adjusted position.

The fuel delivery outlet of the fuel passage 130 is formed in a boss 144 at the lower side of the mixing passage which provides a restricted region in the mixing passage simulating a Venturi action to promote increased air velocity through this region of the mixing passage and hence increase the aspiration or reduced pressure effective to lift fuel from the fuel tank at higher engine speeds.

The upper wall 27a of the fuel tank 10a has an opening in which is disposed a fitting 146 fixedly secured as by welding to the upper wall of the fuel tank. The fitting 146 is provided with a bore of a size to snugly and fixedly receive a fuel conveying tube 52a depending into the fuel tank 10a and terminating adjacent the bottom of the fuel tank. In this form of construction, a member 148 fashioned of flexible nonmetallic material such as cloth coated with rubber-like material or a plastic sheet is disposed between the carburetor body and the fuel tank in the manner hereinbefore described in connection with the first form of the invention.

The sheet-like member 148 is fashioned with a U-shaped cut out portion or slot 150, particularly shown in FIGURE 10, providing a tongue or flap portion 152 which functions as a check valve to normally maintain fuel in the tube 52a by preventing return flow of fuel to the tank. The flap valve 152 engages the upper surface 154 of the fitting 146, the said surface forming a valve seat for the flap valve 152.

The region of the carburetor body adjacent the flap valve 152 is fashioned with a space or chamber 155 to accommodate opening movements of the flap valve 152. A counterbore is provided between the fuel passage 130 and the chamber 155 in which is disposed a fuel filter or screen 160. The material of the gasket 148 and flap valve 152 integral therewith is flexible so that reduced pressure or aspiration in the mixing passage 32a flexes the flap valve 152 upwardly from its seat 154 to admit fuel through tube 52a past the flap valve 152, through the chamber 155 and passage 130 for discharge into the mixing passage 32a. The flap valve 152 provides a check valve means to normally maintain fuel in the tube 52a but which is readily opened by aspiration or suction in the mixing passage 32a to facilitate fuel flow from the fuel tank into the mixing passage.

It is to be understood that in both forms of the invention, the mixing passage may be configurated or shaped to provide a conventional Venturi in the mixing passage with the fuel discharge outlet or orifice at the region of the choke band or zone of restriction of the Venturi.

Figure 11:
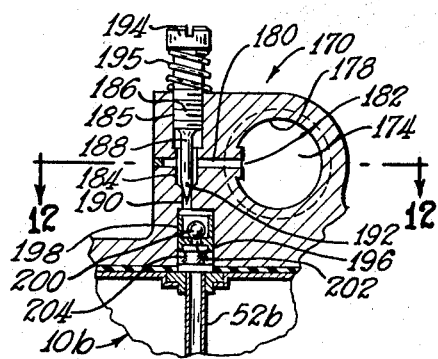
FIGURE 11 is a fragmentary vertical sectional view illustrating a modification of the invention.
Figure 12:
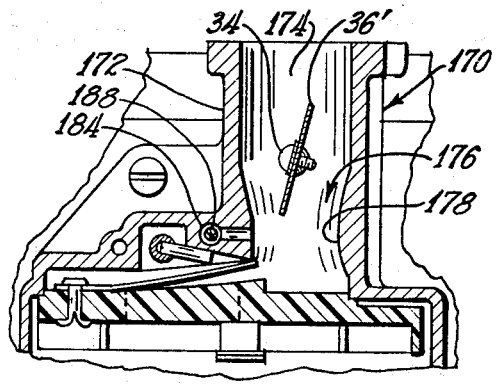
FIGURE 12 is a fragmentary sectional view taken substantially on the line 12—12 of FIGURE 11.

FIGURES 11 and 12 illustrate a modified form of fuel feed and delivery channels wherein the mixing passage is fashioned with a Venturi configuration. The carburetor body 170 has a cylindrically shaped portion 172 providing a mixing passage 174 in which is disposed a throttle valve 36' mounted upon a shaft 34'.

In this form, the mixing passage in the carburetor body is shaped to provide a Venturi 176 having a choke band or restricted zone 178, as shown in FIGURE 12. The carburetor body has a horizontal fuel passage 180, the outlet of which provides a fuel delivery orifice 182 opening into the choke band or restricted zone 178 of the Venturi.

A vertical bore 184 is provided in the body threaded at 185 to accommodate the threaded portion 186 of a fuel adjusting valve body 188. The bore 184 is in communication with a fuel passage 190 and a needle valve portion 192 of the valve body 188 cooperates with the fuel passage 190 to regulate or meter fuel flow to the fuel delivery orifice 182. The valve 188 is provided with a manipulating head 194 and a coil spring 195 is disposed between the head and the carburetor body to provide sufficient friction to retain the fuel metering valve 192 in adjusted position.

The carburetor body 170 is provided with a bore 196, the axis of which is offset from or out of alignment with the axis of the fuel passage 190, as shown in FIGURE 11. Disposed in the bore 196 is a retainer or cage 198 for a check valve 200 of the ball type, the retainer 198 being pressed or snugly fitted into the bore 196. The retainer 198 is provided with a port 202 arranged to be normally closed by the ball valve 200 to prevent return flow of fuel into the fuel tank 10b. The bore 196 is offset from the fuel passage 190 so that the ball valve 200, when elevated from its seat, will not obstruct the entrance to the fuel passage 190.

A screen or filter 204 is preferably disposed in the bore 196. The bore 196 is in communication with the fuel supply tube 52b extending into the fuel tank for conveying fuel from the tank to the bore 196 under the influence of aspiration or suction in the mixing passage 174. The Venturi 176 provides increased lifting effort to elevate fuel from the tank 10b into the mixing passage. The valve 188 is manually adjustable for regulating or metering fuel delivery to the orifice or fuel nozzle 182. It is to be understood that the fuel channel and metering valve arrangement shown in FIGURE 11 may be employed with a generally cylindrically shaped mixing passage of the character shown at 124 in FIGURE 4.

Figure 13:
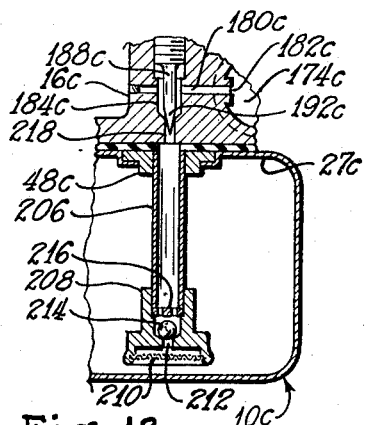
FIGURE 13 is a sectional view similar to FIGURE 9 illustrating a modification of the invention.

FIGURE 13 illustrates a modified arrangement of fuel conveying tube and check valve construction. In this form, a fuel conveying tube 206 is secured to the upper wall 27c of the fuel tank 10c by a fitting 48c. Secured to the lower end of the fuel conveying tube 206 is a fitting 208 provided with a filter or screen 210 at its entrance end adjacent the bottom of the fuel tank 10c. The fitting 208 has an entrance port 212 which is normally closed by a ball check valve 214.

Means such as a mesh-like retainer 216 is disposed above and spaced from the ball valve 214 to prevent dislodgement of the valve and facilitate flow of fuel around mixing passage, one of said reed valves being of greater thickness than the other to secure differential opening movements of the reed valves under the influence of aspiration in the mixing passage.

References Cited

UNITED STATES PATENTS

| | | | |
|---|---|---|---|
| 1,632,198 | 6/1927 | Ritter. | |
| 2,148,071 | 2/1939 | Irgens | 261—62 X |
| 2,680,605 | 6/1954 | Bracke. | |
| 2,685,867 | 8/1954 | Bergman | 123—73 X |
| 3,008,459 | 11/1961 | Kaufman | 123—73 |
| 2,994,517 | 8/1961 | Fenton. | |
| 3,191,618 | 6/1965 | McKim | 123—73 X |

FOREIGN PATENTS 615,674  1/1949  Great Britain.

RONALD R. WEAVER, Primary Examiner

U.S. Cl. X.R.

123—119; 261—64